(12) United States Patent  (10) Patent No.: US 9,338,155 B2
Quach et al.  (45) Date of Patent: *May 10, 2016

(54) SECURITY DEVICE PROVISIONING

(71) Applicant: SecureAuth Corporation, Irvine, CA (US)

(72) Inventors: Allen Yu Quach, Rosemead, CA (US); Jeffrey Chiwai Lo, Irvine, CA (US); Garret Florian Grajek, Aliso Viejo, CA (US); Mark V. Lambiase, Ladera Ranch, CA (US)

(73) Assignee: SecureAuth Corporation, Irvine, CA (US)

( * ) Notice: Subject to any disclaimer, the term of this patent is extended or adjusted under 35 U.S.C. 154(b) by 183 days.

This patent is subject to a terminal disclaimer.

(21) Appl. No.: 13/964,615

(22) Filed: Aug. 12, 2013

(65) Prior Publication Data

US 2013/0333013 A1  Dec. 12, 2013

Related U.S. Application Data

(63) Continuation of application No. 13/035,289, filed on Feb. 25, 2011, now Pat. No. 8,510,816.

(60) Provisional application No. 61/308,259, filed on Feb. 25, 2010, provisional application No. 61/312,137, filed on Mar. 9, 2010.

(51) Int. Cl.
*H04L 29/06* (2006.01)
*H04L 9/32* (2006.01)

(52) U.S. Cl.
CPC .............. *H04L 63/08* (2013.01); *H04L 9/3215* (2013.01); *H04L 9/3228* (2013.01); *H04L 63/0853* (2013.01)

(58) Field of Classification Search
CPC ... H04L 9/3215; H04L 63/08; H04L 63/0853; H04L 9/3228
USPC ........... 726/4, 5, 6, 7; 713/201, 155, 186, 168
See application file for complete search history.

(56) References Cited

U.S. PATENT DOCUMENTS 4,868,877 A    9/1989  Fischer
5,881,226 A    3/1999  Veneklase
(Continued)

OTHER PUBLICATIONS

Authentication in an Internet Banking Environment; Federal Financial Institutions Examination Council; 2001, 14 Pages.
Dierks, T., et al., Network Working Group, The Transport Layer Security (TLS) Protocol Version 1.1, Apr. 2006, 88 pages.
Gutmann, Peter, Everything you Never Wanted to Know about PKI but were Forced to Find Out, University of Aukland, presentation, Aug. 2002, 48 Pages.

(Continued)

*Primary Examiner* — Brandon Hoffman
*Assistant Examiner* — Nega Woldemariam
(74) *Attorney, Agent, or Firm* — Knobbe, Martens, Olson & Bear, LLP

(57) ABSTRACT

The provisioning of a security token object to a user is disclosed. The security token object is used for accessing a computing resource through a mobile device. A security token object provisioning request may be received from the mobile device. In response, an authentication request may be transmitted. The user is authenticated against a user identity based upon a set of received identity credentials provided by the user. The extraction of a unique token identifier from the security token object is initiated, and completed without intervention from the user. The unique token identifier received from the client computer system is associated with to the user identity in a data store. By providing the security token object, the user can gain access to the computing resource.

20 Claims, 5 Drawing Sheets

(56) References Cited

U.S. PATENT DOCUMENTS

| | | | |
|---|---|---|---|
| 5,999,711 | A | 12/1999 | Misra et al. |
| 6,026,166 | A | 2/2000 | LeBourgeois |
| 6,035,406 | A | 3/2000 | Moussa et al. |
| 6,324,645 | B1 | 11/2001 | Andrews et al. |
| 7,120,929 | B2 | 10/2006 | Beattie et al. |
| 7,127,607 | B1 | 10/2006 | Su et al. |
| 7,131,009 | B2 | 10/2006 | Scheidt et al. |
| 7,140,036 | B2 | 11/2006 | Bhagavatula et al. |
| 7,143,286 | B2 | 11/2006 | Brown et al. |
| 2005/0138421 | A1* | 6/2005 | Fedronic et al. ............ 713/201 |
| 2005/0289356 | A1 | 12/2005 | Shoham |
| 2007/0174243 | A1 | 7/2007 | Fritz |
| 2007/0255662 | A1 | 11/2007 | Tumminaro |
| 2009/0025074 | A1 | 1/2009 | Le Saint et al. |
| 2009/0133107 | A1 | 5/2009 | Thoursie |
| 2009/0198618 | A1 | 8/2009 | Chan et al. |
| 2009/0300744 | A1* | 12/2009 | Guo et al. ...................... 726/7 |
| 2010/0011210 | A1 | 1/2010 | Scarlata |
| 2011/0197070 | A1 | 8/2011 | Mizrah |

OTHER PUBLICATIONS

Housley, R., et al., Network Working Group, Internet X.509 Public Key Infrastructure Certificate and Certificate Revocation List (CRL) Profile, Apr. 2002, 108 pages.

http://www.entrust.com/pki.htm What is a PKI? Dec. 8, 2006, 5 pages.

http://www.articsoft.com/wp_pki_intro.htm Introduction to Public Key Infrastructure, printed Jan. 26, 2007, 6 pages.

Kent, S., Working Group, Privacy Enhancement for Internet Electronic Mail: Part II: Certificate-Based Key Management, Feb. 1993, 29 pages.

Marchesini, et al., Keyjacking: The Surprising Insecurity of Client-side SSL, Dartmouth College, Feb. 13, 2004, 16 Pages.

Meyers, M., et al., Network Working Group, X.509 Internet Public Key Infrastructure Online Certificate Status Protocol-OCSP, Jun. 2009, 21 pages.

International Search Report, dated May 17, 2011: re PCT/US 11/26338.

* cited by examiner

HELP DESK

USER ID: [USER01]   [GET USER]   [LOGOUT]

FIRST NAME: [USER01]
LAST NAME: [ ]
HOME PHONE: [949-555-1246]
DOMESTIC MOBILE: [ ]
INT'L MOBILE: [ ]
OFFICE PHONE: [ ]
EXCHANGE E-MAIL: [USER01@EXAMPLE.COM]
PERSONAL E-MAIL: [ ]
UMIKEY: [UNIJECEBLLJF] — 74
CERT COUNT: [0]
DYNAMIC CERT VALIDATION DATE: [02] / [23] / [2010]   [05] : [57]

☐ CLEAR THE USER'S KNOWLEDGE BASED ANSWERS (DISABLED IF FIELD IS EMPTY)   RESET USER REGISTRATIONS

CHALLENGE QUESTION: [WHAT IS THE LAST HIGH SCHOOL YOU ATTENDED?]
USER'S ANSWER: [ ]

[UPDATE]

| FIRST NAME: | USER01 |
| --- | --- |
| LAST NAME: | |
| HOME PHONE: | 949-555-1246 |
| DOMESTIC MOBILE: | |
| INT'L MOBILE: | |
| OFFICE PHONE: | |
| EXCHANGE E-MAIL: | USER01@EXAMPLE.COM |
| PERSONAL E-MAIL: | |
| UMIKEY: | |
| CERT COUNT: | 0 |

FIG. 5

SECURITY DEVICE PROVISIONING

CROSS-REFERENCE TO RELATED APPLICATIONS

This application is a continuation of, U.S. patent application Ser. No. 13/035,289 filed on Feb. 25, 2011, soon to issue as U.S. Pat. No. 8,510,816, which claims priority to U.S. Provisional Application No. 61/308,259 filed Feb. 25, 2010 and U.S. Provisional Application No. 61/312,137 filed Mar. 9, 2010. The entire disclosure of these priority applications are hereby incorporated by reference herein in their entirety.

BACKGROUND

1. Field of the Invention

The present invention relates generally to computer security and authentication of authorized users. More particularly, the present invention relates to methods for issuing, validating, and revoking hardware security devices utilized in connection with bi-directional authentication between client and server computer systems.

2. Description of the Related Art

Banking, financial services, government education, and all varieties of enterprises rely upon advanced computer systems and data communications such as the Internet to transact and share information. While these advancements have greatly increased the speed and convenience with which business is conducted, numerous vulnerabilities can potentially compromise the security of the highly sensitive and confidential data being exchanged.

In an open network environment, the primary concern of data security is three-fold. First, the server must be assured that the client is what it asserts it is. Second, the client must be assured that the server is what it asserts it is. Third, any information being exchanged between a legitimate server and a legitimate client must not be intercepted or changed by any other computer system on the network.

Various techniques are used to authenticate, or verify the identity of the client. Authentication may utilize one or more factors, which include something a user knows, something a user has, and something a user is. Most often, only a single factor is utilized because of the added cost and complexity of additional authentication factors. In such single-factor authentication systems, the most common is the use of a password to limit access. The server maintains a list of usernames and corresponding passwords. When the supplied username and password combination is determined to be correct after a comparison to the list, access to the system is permitted. The secret nature of passwords, at least in theory, prevents unauthorized users from accessing the computer system.

Simple password protection is oftentimes ineffective because the authorized users mistakenly and unwittingly reveal their passwords to an unauthorized user. Furthermore, brute-force techniques involving the entry of every combination of letters, numbers, and symbols, as well as dictionary-based techniques, may further compromise the effectiveness of such authentication systems. Because passwords must be memorized, users often choose words that are easier to remember, making it more susceptible to defeat by means of dictionary attacks. On the other hand, the more complex the passwords are required to be, the more likely that the password will be written on something easily accessible, for both the legitimate and malicious user, in the vicinity of the computer.

In addition to passwords, an additional factor may be utilized that involves something a user has. These include simple devices that are connected to the client computer through an external peripheral port, as well as sophisticated tokens that generate unique codes or one-time passwords (OTP) that are that are entered in conjunction with a username and a password as described above.

While greatly increasing security, token devices are cumbersome to manage, as each new device introduced into the system requires an extensive provisioning procedure. Currently, it is necessary to input a seed value into the management system and then associated to a user identity. Furthermore, unique identifiers associated with the tokens must be entered into the management system in order to link the same to the user. Because tokens are diminutive in size and tend to become lost easily, revocation of the old device and provisioning a new device may become a frequent occurrence. Due to processing backlogs, replacement and re-provisioning may be significantly delayed, leading to additional cost in lost productivity. Accordingly, there is a need in the art for improved security device provisioning.

SUMMARY

An embodiment of the present disclosure contemplates a method for provisioning a security token object to a user. The security token object may be used for accessing a computing resource through a client computer system. The method may begin with receiving a security token object provisioning request from the client computer system. Then, in response to receiving the security token object provision request, there may be a step of transmitting an authentication request to the client computer system. There may be a step of authenticating the user against a user identity based upon a set of identity credentials received from the client computer system as provided by the user. The user identity may be stored on a data store associated with the computing resource. The method may include initiating the extraction of a unique token identifier from the security token object without intervention from the user in response to a successful authentication of the user. There may also be a step of associating the unique token identifier received from the client computer system to the user identity in the data store. The user may be authenticated for access to the computing resource based at least partially upon a subsequent validation of the security token object against the unique token identifier retrieved from the data store. Thus, a security token object can be provisioned after authenticating a user according to a predefined configuration sequence, eliminating the need for help desk assistance in device registration. The present invention will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which:

FIG. 4 is a segment of the user interface for the security token object provisioning application with a new security token object being associated with a user identity; and FIG. 5 is a segment of the user interface for the security token object provisioning application shown in FIG. 4, but with no security token object associated with the user identity.

Common reference numerals are used throughout the drawings and the detailed description to indicate the same elements.

DETAILED DESCRIPTION OF THE PREFERRED EMBODIMENT

The detailed description set forth below in connection with the appended drawings is intended as a description of the several presently contemplated embodiments of issuing, validating, and revoking hardware security devices. It is not intended to represent the only form in which the disclosed invention may be developed or utilized. The description sets forth the functions in connection with the illustrated embodiments. It is to be understood, however, that the same or equivalent functions may be accomplished by different embodiments that are also intended to be encompassed within the scope of the present disclosure. It is further understood that the use of relational terms such as first and second and the like are used solely to distinguish one from another entity without necessarily requiring or implying any actual such relationship or order between such entities.

Figure 1:
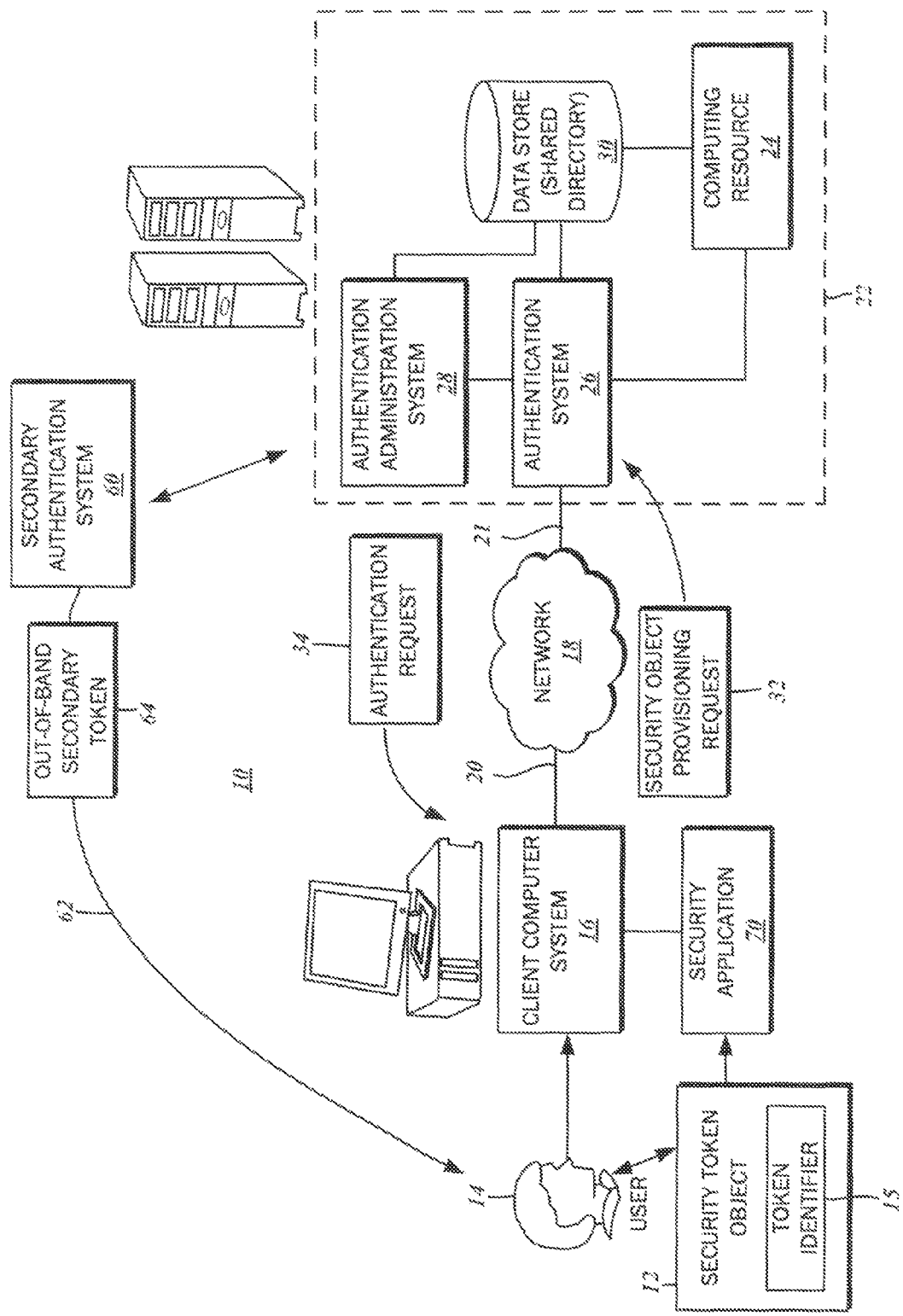
FIG. 1 is a block diagram illustrating the an exemplary environment within which various embodiments of the present disclosure may be implemented.

With reference to the block diagram of FIG. 1, there is illustrated an exemplary network computing environment 10 in the context of which various embodiments of the presently contemplated methods for provisioning a security token object 12 to a user 14 may be implemented. Generally, the network computing environment 10 includes a client computer system 16, which by way of example only, is a conventional desktop computer having a central processing unit, memory, and various input/output devices such as keyboards, mice, and display units connected thereto. The client computer system 16 is connected to a network 18 via a network connection 20 to access different server resources also connected to the network 18. Although a specific type of client computer system 16 has been referenced, it will be recognized this is also intended to encompass any data processing apparatus operated by the user 14, including smart phones, laptop computers, tablet computing devices, and so forth.

One of the possible server resources to which the client computer system 16 is capable of connecting is an enterprise server system 22. In this context, the term server is understood to refer to its role as a provider of services, in contrast to the client as a requestor of services. There are a number of components that are a part of the enterprise server system 22, and specific reference thereto will be made as applicable. Along these lines, it will be understood that the particular grouping and arrangement of such components as being a part of the overall enterprise server system 22 is by way of illustrative example only. The various components may be managed at different locations and by different entities, as will be explained further below. Although a single network connection 21 is shown as connecting the enterprise server system 22 to the network 18, each of the components may have an independent network connection.

The client computer system 16 accesses the enterprise server system 22 to utilize one or more computing resources 24, with an authentication system 26 and an authentication administration system 28, in conjunction with an enterprise data store 30 or directory having security support roles. The authentication system 26 and the authentication administration system 28 may be an "appliance" type device that is deployed within the enterprise server system 22, or may be provided as a service (Software as a Service, or SaaS).

The computing resources 24 are referenced expansively and understood to include any data processing functionality utilized by an enterprise, such as billing, payment processing, content management, e-mail, file sharing, customer relationship management, scheduling, business management, sales force management, and so forth. Furthermore, beyond the aforementioned enterprise-level applications, the computing resources 24 may also include publicly accessible services such as electronic banking and e-commerce.

Due to the multiple-user nature of the computing resource 24, each user 14 is provided a separate account identity for access. As a first layer of security in preventing unauthorized use, each account identity may be protected with, for example, a password that is purportedly known only by the specific user 14. To simply management of account identities for multiple computing resources 24, a directory service that utilizes the data store 30 may be utilized. It is understood that the directory service and the associated data store 30 is a central repository for all user account identity information across the enterprise server system 22. In addition to the basic username/password information, the data store 30 may include other data such as first name, last name, home phone number, domestic mobile phone number, international phone number, office phone number, enterprise e-mail address, personal e-mail address, etc., depending on the needs of the particular enterprise.

In general, the present disclosure contemplates various methods for provisioning or associating the security token object 12 with the user account identity on the data store 30. As mentioned above, a single factor authentication may be insufficient, and a second authentication factor, that is, the security token object 12, may also be required by the authentication system 26 to confirm that the user attempting to gain access is authorized to do so. After validating the multiple factors, the user 14 is granted access and redirected from the authentication system 26 to the computing resource 24.

The security token object 12 is understood to be an item that the user 14 physically has in his or her possession that can be uniquely identified and tied to the user 14. Accordingly, any security token object 12 is understood to have a unique token identifier 15. The possession of the security token object 12 increases the likelihood that the access attempt is legitimate.

In accordance with some embodiments, the security token object 12 is external to the client computer system 16, but can be interconnected therewith. One example is a Universal Serial Bus (USB) data storage device that is connectible to a corresponding USB port on the client computer system 16. The token identifier 15 for such a USB storage device may be a USB device serial number stored thereon. Additionally, there are USB devices that are specifically configured as "keys" for security purposes such as the UmiKey device.

In other embodiments, the security token object 12 may be a component of the client computer system 16. Thus, the client computer system 16 itself may be deemed to be something the user 14 physically has in his or her possession. Most conventional client computer systems 16 utilize the Peripheral Component Interconnect (PCI) standard for connecting hardware devices, and the security token object 12 may be one of the cards connected to the PCI bus. Some client computer systems 16 also include a Trusted Platform Module (TPM) security device that stores, generates and restricts the use of cryptographic keys. The security token object 12 may be the TPM chip. The token identifier 15 for these devices may be a unique serial number stored and retrievable therefrom.

Conventional smart phones have substantial data processing capabilities, and in many cases, it may be utilized to access the computing resources 24. In this regard, the security token object 12 may also be the phone itself, or various uniquely identifiable components thereof. Thus, the security token object 12 may be considered as being internal to the client computer system 16 such as the PCI card or the TPM chip mentioned above. In one embodiment, the token identifier may be the assigned phone number, or a device serial number/identification number associated with the transceiver or the Subscriber Identity Module (SIM) card. These unique identifiers may also be read from a standalone client computer system 16 as well, and in which case the security token object 12 would be external thereto like the USB key.

It will be recognized by those having ordinary skill in the art that the foregoing security token objects 12 are exemplary only. Any other suitable devices may be substituted without departing from the scope of the present disclosure.

As indicated above, a method for provisioning the security token object 12 is contemplated. Furthermore, the client computer system 16, the authentication system 26, and the authentication administration system 28 are understood to have software instructions stored in a tangible medium thereon that, when executed, perform various functions in accordance with the contemplated methods. In accordance with various aspects of the methods, the registration or provisioning process may be completed by the user 14 without administrator intervention via a graphical user interface.

Figure 2:
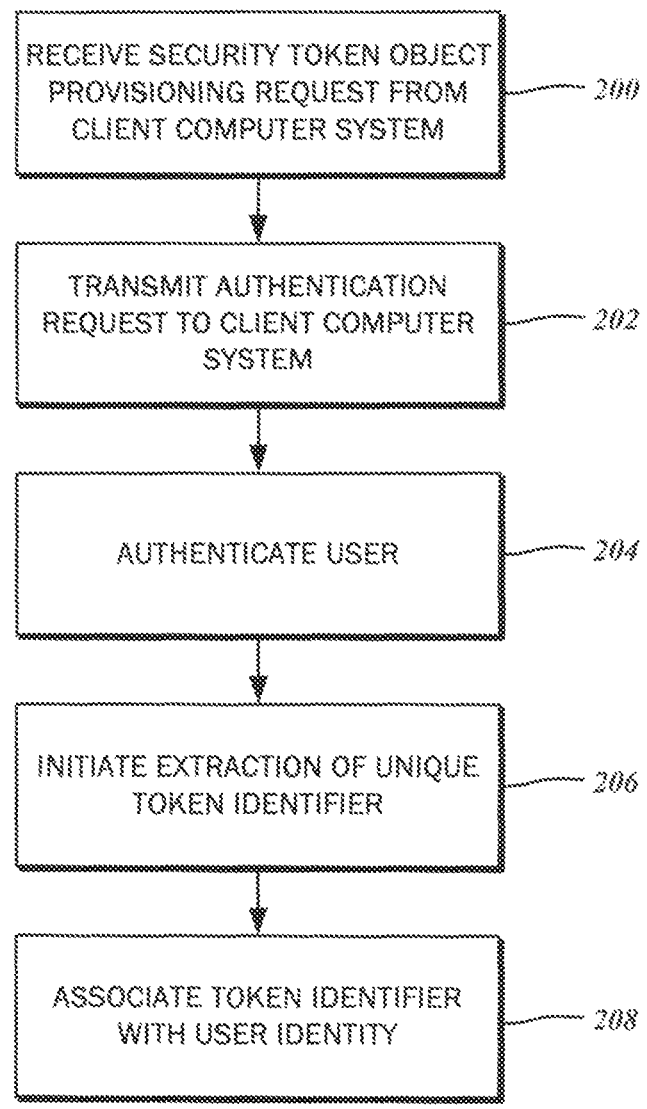
FIG. 2 is a flowchart of one contemplated embodiment of a method for provisioning a security token object to a user.

With reference to the flowchart of FIG. 2 as well as the block diagram of FIG. 1, the method begins with a step 200 of receiving a security token object provisioning request 32 from the client computer system 16. This may be received by the authentication system 26 as a request to authenticate the user 14 based upon a submission of the user name, password, and the token identifier 15. When the authentication system 26 determines that no security object token 12 is associated with the submitted user name, then the attempt to authenticate may be considered to be the security token object provisioning request 32. Alternatively, the client computer system 16 may be directed to the authentication system 26 upon the security token object 12 being connected thereto. The security token object 12 may have an embedded Uniform Resource Locator for the authentication system 26 that is processed by the client computer system 16 to retrieve data from the same. In this context, such URL retrieval request may be considered to be the security token object provisioning request 32. It will be recognized that a variety of steps may fall under the ambit of receiving the security token object provisioning request 32.

In response to receiving the security token object provisioning request 32, the method continues with a step 202 of transmitting an authentication request 34 from the authentication system 26 to the client computer system 16. According to one embodiment, the authentication request 34 is a web page generated by the authentication system 26 to request the username and password combination for the user 14 and a valid corresponding account identity on the data store 30.

Figure 3:
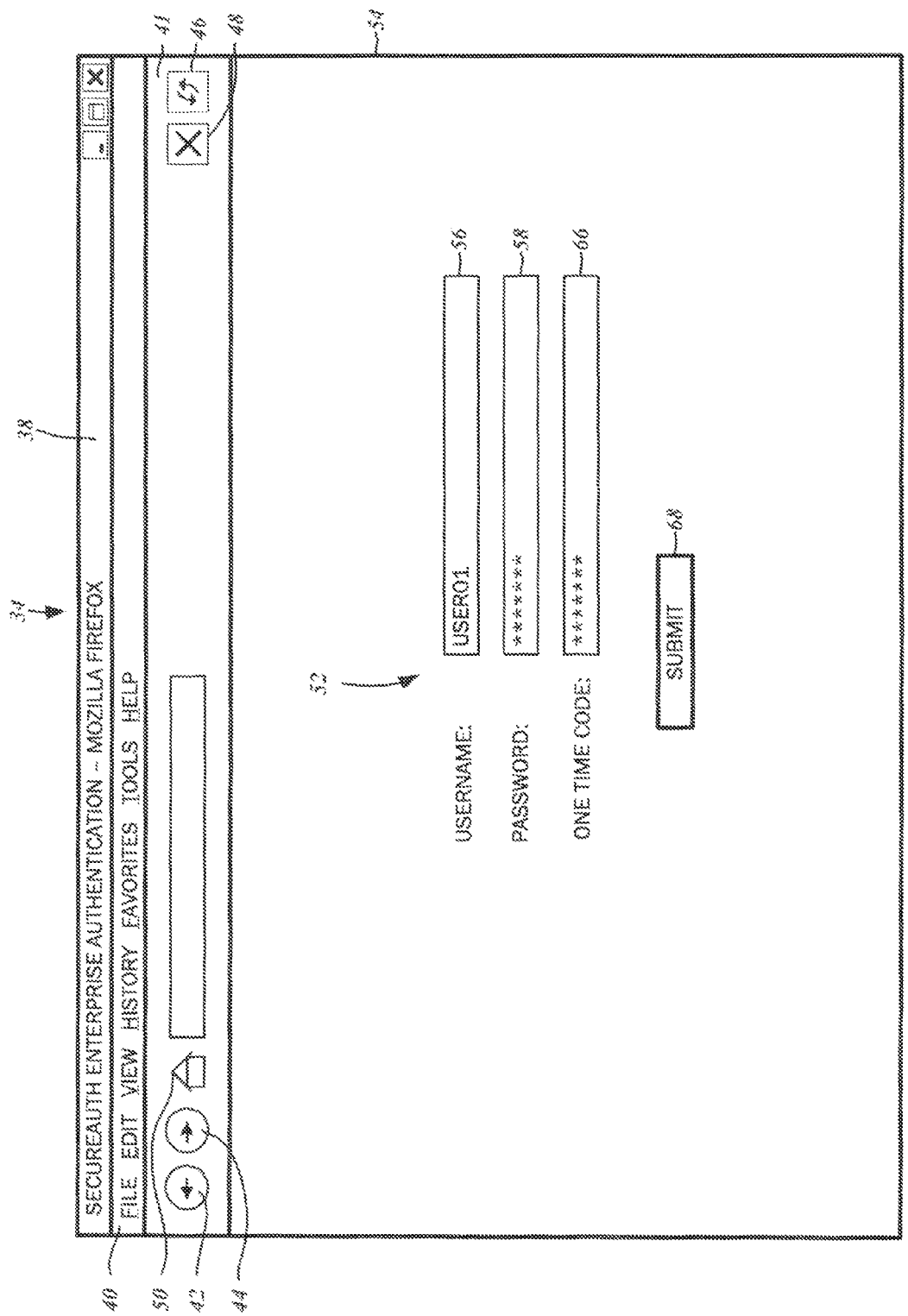
FIG. 3 is a user interface for a security token object provisioning application as rendered by a web browser, with an identity credentials entry form being shown.

The client computer system 16 is understood to have a web browser application such as Internet Explorer from Microsoft Corporation of Redmond, Wash., or Firefox from the Mozilla foundation that communicate with the authentication system 26 and the authentication administration system 28. With reference to FIG. 3, an exemplary user interface 36 of the web browser application is displayed in a display device connected to the client computer system 16. As dictated by the common graphical user interface of the operating system, the browser interface 36 typically includes a title bar 38, and a menu bar 40. Furthermore, the browser interface 36 includes a tool bar 41 with a back navigation icon 42, a forward navigation icon 44, a reload icon 46, a cancel icon 48, and a home page icon 50, the functions of which in relation to web browsing will be readily recognized by those having ordinary skill in the art.

Once received by the client computer system 16, the authentication request, and specifically an identity credentials entry form 52, is rendered within a browser window 54. The identity credentials entry form 52 includes a first form element 56 for accepting input of the user name, as well as a second form element 58 for accepting input of the corresponding password.

According to another aspect of the presently contemplated provisioning method, a secondary identity credential may also be requested in the form 52. As shown in FIG. 1, there may be a secondary authentication system 60 that utilizes an out-of-band communication channel 62 that is separate from the network 18 and its related connections 20, 21 to transmit an out-of-band security token to the user 14. This includes a one-time password that is send via Short Message Service (SMS) or voice message over a telephone network. The generated on-time password is also communicated to the authentication system 26 for validation as will be described in further detail below.

Instead of utilizing a time-limited token, there are other types of user-specific information that can be requested as a further basis for validation. One may be a static personal identification number (PIN) that is distinct from the password. Another is a knowledge-based answer that, in theory, only the valid user 14 or otherwise very intimate associated should know, such as the name of the user's first car, the name of the user's high school mascot, and so forth. Further, a digital certificate that is stored on the client computer system 16 could also serve as a secondary identity credentials. Multiple types and combinations of various identity credentials may be requested.

Whichever one is selected for use, the identity credentials entry form 52 is understood to include a third form element 66 for the acceptance of the secondary identity credential. With the form elements 54, 56, 66 filled, a submit button 68 may be activated to transmit the entered data to the authentication system 26.

Referring again to the flowchart of FIG. 2, the method continues with a step 204 of authenticating the user 14 against the specified user identity on the data store 30. In general, this involves a comparison of the supplied password in the identity credentials entry form 52 to that associated with the user identity. Additionally, to the extent that secondary identity credentials were requested, those are confirmed to be valid as well.

After authenticating the user 14, the method then includes a step 206 of initiating the extraction of the unique token identifier 15 from the security token object 12 without intervention from the user. A security application 70 is running on the client computer system 16, which receives the instructions from the authentication system 26 to extract the token identifier 15. It is contemplated that the security application 70 is capable of recognizing the various types of security token objects 12 mentioned above, and the specific locations from which to retrieve the data for the token identifier 15. The security application 70 may be available software that is resident on the operating system of the device whether that is a mobile platform or a desktop platform. Furthermore, the security application 70 may be software that runs in a runtime environment such as Java, .Net, Flash, and so forth. Browser-based versions of the security application 70 are also contemplated, and would require no additional downloads or client objects to install.

Upon receiving the token identifier 15 from the security application 70, it is associated with the specified user identity in the data store 30 per step 208. As best shown in FIG. 4, the user identity data from the data store 30 populates a configuration form 72 that has various fields for first name, last name, phone numbers, e-mail accounts, security questions, and the like of the authorized user 14. This configuration form 72 may be generated by the authentication administration system 28. Pertinent to the method for provisioning the security token object 12 is a token identifier field 74 that records the token identifier 15 retrieved from the security application 70. With this interface, it is possible to administer graphically the provisioning of the security token object 12.

With the flexibility afforded in the configuration of the data store 30, multiple security token object 12 registration policies may be configured for different object types and different users 14. Along these lines, single or multiple data stores 30 may be configured for registering the security token object 12. Any existing schema attribute or extended schema attribute may be utilized to store the token identifier 15 in the data store 30.

Since the security application 70 retrieves the token identifier 15 from the security token object 12, there is understood to be no need for the user to find and input this data into the authentication administration system 28. Indeed, there user 14 may be have no exposure to or handle the token identifier 15, thus simplifying provisioning operations. Along these lines, it is not necessary for the authentication system 26/authentication administration system 28 to have prior knowledge of a seed value that is associated with the particular security token object 12, and is, in fact, inaccessible. In general, the authentication system 26 and the authentication administration system 28 have no knowledge of the security token object 12 prior to provisioning, and the token identifier field 74 of the configuration form 72 is blank. In part because of this, it is contemplated that the user 14 can be issued the security token object 12 without prior set up, and can also utilize devices that may already be issued or personally owned.

Revocation of the security token object 12 is likewise a straightforward procedure. As shown in FIG. 4, the existing contents of the token identifier field 74 and its corresponding field in the data store 30 are deleted to remove the association between the user identity and the security token object 12. This procedure may be conducted via the authentication administration system 28, or any other component that has access to the data store 30 to perform the deletion. Because there is no longer a token identifier 15 recorded, the user would not be able to gain access to the enterprise server system 22. The dis-associated security token object 12 may then be assigned to a different user 14 through the provisioning/enrollment procedure discussed above.

The particulars shown herein are by way of example and for purposes of illustrative discussion of the embodiments of the present disclosure only and are presented in the cause of providing what is believed to be the most useful and readily understood description of the principles and conceptual aspects. In this regard, no attempt is made to show details of the present invention with more particularity than is necessary for its fundamental understanding, the description taken with the drawings making apparent to those skilled in the art how the several forms of the present invention may be embodied in practice.

What is claimed is:

1. A method for provisioning a security token for a user, the method comprising:
   receiving a security token provisioning request from a mobile device over a network;
   in response to receiving the security token provisioning request, transmitting, to the mobile device over the network, an authentication request configured to prompt a user of the mobile device to provide authentication information related to a user identity;
   receiving, from the mobile device over the network, the authentication information related to the user identity;
   authenticating the user identity against an enterprise data store using the authentication information by comparing the authentication information with reference authentication information in the data store without the use of a unique token identifier from the security token;
   initiating the extraction of the unique token identifier from the security token without intervention from the user in response to a successful authentication of the user identity, wherein initiating the extraction of the unique token identifier comprises transmitting instructions to a web enabled application for initiating a security application running on the mobile device to read the unique token identifier from the security token;
   receiving, from the mobile device over the network, the extracted unique token identifier sent by the mobile device in response to a successful extraction of the unique token identifier;
   in response to receiving the extracted unique token identifier from the mobile device, associating the unique token identifier with the user identity in the data store by storing the unique token identifier in the data store in association with the user identity; and
   authenticating the user for access to a computing resource based at least partially upon a subsequent validation of the security token against the unique token identifier retrieved from the data store.

2. The method of claim 1, further comprising:
   removing the association of the unique token identifier with the user identity in the data store;
   wherein the user is excluded from access to the computing resource based at least partially upon a failed validation of the security token against the unique token identifier retrieved from the data store.

3. The method of claim 1, wherein the authentication request includes an authentication information entry form with form elements corresponding to the authentication information and receptive to user input thereof from the user on the mobile device.

4. The method of claim 3, wherein authenticating the user identity against the enterprise data store includes:
   receiving the authentication information entered into the authentication information entry form.

5. The method of claim 3, wherein the authentication information entry form is a web page rendered by a browser application on the mobile device.

6. The method of claim 1, wherein the data store is independent of the computing resource.

7. The method of claim 1, wherein the authentication information is selected from a group consisting of: a username identifier, a password, an out-of-band security token delivered via short message service (SMS), an out-of-band security token delivered via telephone, a static personal identification number, a knowledge-based answer, and a digital certificate.

8. The method of claim 1, wherein an extended scheme attribute is used to associate the unique token identifier with the user identity in the data store.

9. The method of claim 1, wherein the security application running on the mobile device is executed in an environment that is not a third party run-time environment.

10. The method of claim 1, wherein the security application running on the mobile device is executed in a third party run-time environment.

11. The method of claim 1, wherein the security token is a UmiKey device.

12. The method of claim 1, wherein the security token is a Universal Serial Bus (USB) data storage device connectible to a corresponding USB port of the mobile device.

13. An article of manufacture comprising a non-transitory program storage medium readable by a data processing apparatus, the medium tangibly embodying one or more programs of instructions executable by the data processing apparatus to perform a method for provisioning a security token for a user for accessing a computing resource through a mobile device, the method comprising:
receiving a security token provisioning request from the mobile device over a network;
in response to receiving the security token provisioning request, transmitting, to the mobile device over the network, an authentication request configured to prompt the user of the mobile device to provide authentication information related to a user identity;
receiving, from the mobile device over the network, the authentication information related to the user identity;
authenticating the user identity against an enterprise data store using the authentication information by comparing the authentication information with reference authentication information in the data store without the use of a unique token identifier from the security token;
initiating the extraction of the unique token identifier from the security token without intervention from the user in response to a successful authentication of the user identity, wherein initiating the extraction of the unique token identifier comprises transmitting instructions to a web enabled application for initiating a security application running on the mobile device to read the unique token identifier from the security token;
receiving, from the mobile device over the network, the extracted unique token identifier sent by the mobile device in response to a successful extraction of the unique token identifier;
in response to receiving the extracted unique token identifier from the mobile device, associating the unique token identifier with the user identity in the data store by storing the unique token identifier in the data store in association with the user identity; and
authenticating the user for access to the computing resource based at least partially upon a subsequent validation of the security token against the unique token identifier retrieved from the data store.

14. The article of manufacture of claim 13, wherein the method further comprises:
removing the association of the unique token identifier with the user identity in the data store;
wherein the user is excluded from access to the computing resource based at least partially upon a failed validation of the security token against the unique token identifier retrieved from the data store.

15. The article of manufacture of claim 13, wherein the security application running on the mobile device is executed in a third party run-time environment.

16. The article of manufacture of claim 13, wherein the security token is a Universal Serial Bus (USB) data storage device connectible to a corresponding USB port of the mobile device.

17. A computing system for provisioning a security token to a user for accessing a computing resource through a mobile device, the system comprising:
one or more computer readable storage devices configured to store:
a plurality of computer executable instructions;
one or more hardware computer processors in communication with the one or more computer readable storage devices and configured to execute the plurality of computer executable instructions in order to cause the computing system to:
receive a security token provisioning request from the mobile device over a network for the security token interfacing with the mobile device;
in response to receiving the security token provisioning request, transmit, to the mobile device over the network, an authentication request configured to prompt a user of the mobile device to provide authentication information related to a user identity;
receive, from the mobile device over the network, the authentication information related to the user identity;
authenticate the user identity against an enterprise data store using the authentication information by comparing the authentication information with reference authentication information in the data store without the use of a unique token identifier from the security token;
initiate the extraction of the unique token identifier from the security token without intervention from the user in response to a successful authentication of the user identity, wherein initiating the extraction of the unique token identifier comprises transmitting instructions to a web enabled application for initiating a security application running on the mobile device to read the unique token identifier from the security token;
receive, from the mobile device over the network, the extracted unique token identifier in response to a successful extraction of the unique token identifier;
in response to receiving the extracted unique token identifier from the mobile device, associate the unique token identifier with the user identity in the data store by storing the unique token identifier in the data store in association with the user identity; and
authenticate the user for access to the computing resource based at least partially upon a subsequent validation of the security token against the unique token identifier retrieved from the data store.

18. The system of claim 17, wherein the one or more hardware processors are further configured to execute the plurality of computer executable instructions in order to cause the computing system to:
remove the association of the unique token identifier with the user identity in the data store;
wherein the user is excluded from access to the computing resource based at least partially upon a failed validation of the security token against the unique token identifier retrieved from the data store.

19. The system of claim 17, wherein the security application running on the mobile device is executed in a third party run-time environment.

20. The system of claim 17, wherein the security token is a Universal Serial Bus (USB) data storage device connectible to a corresponding USB port of the mobile device.

* * * * *